US 8,098,823 B2

Jan. 17, 2012

(12) United States Patent
Kempf et al.

(54) MULTI-KEY CRYPTOGRAPHICALLY GENERATED ADDRESS

(75) Inventors: James Kempf, Mountain View, CA (US); Craig B. Gentry, Mountain View, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1181 days.

(21) Appl. No.: 11/377,590

(22) Filed: Mar. 16, 2006

(65) Prior Publication Data

US 2006/0253704 A1    Nov. 9, 2006

Related U.S. Application Data

(60) Provisional application No. 60/677,712, filed on May 3, 2005.

(51) Int. Cl.
*H04L 9/00*    (2006.01)

(52) U.S. Cl. ........ 380/277; 713/177; 713/180; 380/285; 380/30

(58) Field of Classification Search ................ 713/171, 713/193, 167, 165, 1, 162, 177–180; 726/9, 726/27, 26, 4, 12; 380/277–285, 30
See application file for complete search history.

(56) References Cited

U.S. PATENT DOCUMENTS

| | | | | |
|---|---|---|---|---|
| 6,188,766 B1* | 2/2001 | Kocher | ........................ | 380/246 |
| 6,594,763 B1* | 7/2003 | Madoukh | ........................ | 726/1 |
| 6,826,690 B1* | 11/2004 | Hind et al. | .................... | 713/186 |
| 6,996,839 B1* | 2/2006 | Edwards | ........................... | 726/5 |
| 7,401,216 B2* | 7/2008 | Arkko et al. | ................. | 713/153 |
| 7,460,670 B1* | 12/2008 | Elliott | ........................... | 380/256 |
| 7,620,978 B1* | 11/2009 | Reddy et al. | ....................... | 726/8 |
| 7,664,855 B1* | 2/2010 | Freed et al. | ................... | 709/225 |
| 7,729,495 B2* | 6/2010 | Lee et al. | ..................... | 380/203 |
| 2002/0133607 A1* | 9/2002 | Nikander | ..................... | 709/229 |
| 2002/0152384 A1 | 10/2002 | Shelest et al. | | |

(Continued)

OTHER PUBLICATIONS

Montenegro, Gabriel; Castelluccia, Claude; "Crypto-Based Identifiers (CBIDs): Concepts and Application"; AMC Transactions on Information and System Security, vol. 7, No. 1; Copyright Feb. 2007; pp. 97-127.

T. Aura; "Cryptographically Generated Addresses (CGA)"; Mar. 2005 IETF RFC 3972/RFC3972; http://www.rfc-archive.org/getrfc.php/rfc=3972; Copyright The Internet Society 2004; pp. 19.

(Continued)

*Primary Examiner* — Nathan Flynn
*Assistant Examiner* — Viral Lakhia
(74) *Attorney, Agent, or Firm* — Haynes and Boone, LLP

(57) ABSTRACT

A method for generating a network address, called a multi-key cryptographically generated address (MCGA), enables the network address to be claimed and defended by multiple network devices. The network address can be generated by (a) obtaining a cryptographically generated identifier using public keys corresponding to the network devices, and (b) applying an address generation function to the cryptographically generated identifier. The address generation function may be a one-way coding function or cryptographic hash of the public keys from all hosts that will advertise or claim the right to use the address. A message that claims authority over the MCGA may include an encrypted digest of the message which is encrypted using the private key of the sender. Authentication of the sender may be achieved by obtaining a test digest from the message using the digest function, decrypting the encrypted digest, and comparing the decrypted digest to the test digest. The signature is generated with only the private key of the host sending the message, but requires the public keys of all the network devices claiming authority to verify.

4 Claims, 3 Drawing Sheets

U.S. PATENT DOCUMENTS

| | | |
|---|---|---|
| 2003/0084293 A1 | 5/2003 | Arkko et al. |
| 2003/0200441 A1* | 10/2003 | Jeffries et al. ............... 713/181 |
| 2004/0008845 A1* | 1/2004 | Le et al. ..................... 380/277 |
| 2004/0064691 A1* | 4/2004 | Lu et al. ..................... 713/158 |
| 2004/0078536 A1* | 4/2004 | Chen .......................... 711/164 |
| 2004/0153652 A1* | 8/2004 | Suga ........................... 713/176 |
| 2005/0044365 A1* | 2/2005 | Haukka et al. ............... 713/171 |
| 2005/0071627 A1* | 3/2005 | Montenegro et al. ......... 713/151 |
| 2006/0083377 A1* | 4/2006 | Ptasinski ..................... 380/270 |
| 2007/0113075 A1* | 5/2007 | Jo et al. ...................... 713/158 |

OTHER PUBLICATIONS

Rivest, Ronald L.; Shamir, Adi; Tauman, Yael; "How to Leak a Secret"; C. Boyd (Ed.): Asiacrypt 2001, LNCS 2248; pp. 552-565.

International Search Report for International Application No. PCT/US2006/017116, 2 pages.

Written Opinion of the International Searching Authority for International Application No. PCT/US2006/017116, 3 pages.

* cited by examiner

Multi-key Cryptographic Address Generation Algorithm

Message Signing Algorithm

MULTI-KEY CRYPTOGRAPHICALLY GENERATED ADDRESS

CROSS-REFERENCE TO RELATED APPLICATIONS

The present application is related to and claims priority to U.S. provisional patent application, Ser. No. 60/677,712, filed on May 3, 2005. The present application is also related to a co-pending patent application ("Co-pending Application") entitled "Secure Address Proxying using Multi-key Cryptographically Generated Address," filed on the same day as the present application by the current inventors of the present application and assigned to the current Assignee of the same application. The Copending Application is hereby incorporated by reference herein in its entirety.

BACKGROUND OF THE INVENTION

1. Field of the Invention

The present invention relates to generating a network addresses for a node in a computer network. In particular, the present invention relates to generating a network address for a node, the network address is to be securely claimed and defended by the node and one or more other nodes in the computer network.

2. Discussion of the Related Art

In a computer network, it is important to ensure that each network address uniquely identifies a single network node.

U.S. Patent Application Publication 2002/0133607, entitled "Address Mechanisms in Internet Protocol" (the "Nikander Application") discloses using a one-way coding function to generate an Internet Protocol (IP) address from one or more components specific to a host which claims the IP address. In the Nikander Application, a recipient of a message from the host reconstructs and checks the IP address using the components. The claiming host uses an authentication protocol or a public key cryptographic protocol to establish data integrity on the message, the tie between the components and the address.

U.S. Patent Application Publication 2002/0152384, entitled "Methods and Systems for Unilateral Authentication of Messages" (the "Schelest Application") discloses deriving an IP Version 6 (IPv6) address hashing the claiming host's public key. In the Schelest Application, a recipient of a message from the claiming host checks the hash of the IPv6 address, and checks a cryptographic signature in the message to verify its data integrity. If both the IPv6 address and the enclosed signature are verified, the recipient accepts the host's claim of ownership over the IPv6 address. "Crypto-Based Identifiers (CBIDs): Concepts and Applications" (the "Montenegro Paper") by Gabriel Montenegro and Claude Castellucia, *ACM Transactions on Information and System Security*, Feburary, 2004, reviews the area of cryptographically generated identifiers and their use in establishing authorization to claim the right to use an address by a single host.

U.S. Patent Application Publication 2003/00849293, entitled "Addressing Mechanisms in Mobile IP" (the "Arkko Application") discloses an owner node delegating the responsibility for its IP address to a second node when the address is generated. In the Arkko Application, the IP address may be cryptographically generated using the methods disclosed in the Nikander or the Schelest Applications. Under the method of the Arkko Application, the owner node obtains a public key of a public/private key pair from the second node, and creates an authorization certificate by signing the obtained public key using the owner node's own private key. The authorization certificate is then provided to the second node, which may then distribute it in any message relating to the owner node's IP address. The second node signs this message, including the authorization certificate, with its private key. A recipient node uses the second node's public key to verify the message and the owner node's public key to verify the authorization certificate. The cryptographic hash of the address verifies the owner node's right to the address and the verified second node's public key in the authorization certificate establishes the second node's right to send messages on behalf of the owner node.

IETF Request for Comment (RFC) 3972, by Aura, March 2005, discloses generating, cryptographically, an IPv6 address and securing the claim of authorization for the IPv6 address in the Neighbor Discovery Protocol (RFC 2461 and RFC 2462). The IPv6 address is generated using both the cryptographic hash of the public key of the owner node and additional information. 64 bits of cryptographic hash serves as the interface identifier of the IPv6 address.

As can be seen from the above, the Nikander and Schelest Applications, the Montenegro Paper, and RFC 3927 relate only to cases in which authorization to use the network address is claimed by a single host. Often, however, it may be necessary to authorize one or most hosts to use an address. Some examples can be found in mobile IPv6 networks and DHCP applications In a mobile IPv6 network, a mobile node may be reached using a home address on a home network to which the mobile node is assigned. The home address does not change regardless of where the mobile node is on the Internet. When the mobile node is in a remote subnet outside of its home subnet, a "home agent" (e.g., a router on the mobile node's home subnet) forwards messages addressed to the home address of the mobile node to a "care of" address, which is a local address in the remote subnet. To prevent the home address from being claimed by another when the mobile node is away from the home network, the home agent must proxy, or defend, the mobile node's home address. However, if the mobile node generates the home address using a cryptographic identifier tied to its public key, only it can securely defend the home address. The proxy defense by the home agent must be done without security.

Under the IPv6 Neighbor Discovery Protocol, even when a host's address is obtained from a Dynamic Host Configuration Protocol (DHCP) server, the host is still required to claim and defend that address on the network. However, such claim and defense cannot be done securely using cryptographically generated addresses because the address is generated by the DHCP server without the host's public key. Nor can the host sign with its private key a message relating to the address, as the host did not generate the address.

While the Arkko Application discloses an owner node delegating advertising and defense of its address to another party, the solution in the Arkko Application is cumbersome. In the Arkko Application, in addition to using both the owner node's and the delegated node's public keys, an attribute certificate is also required. After generating the address, the attribute certificate is sent by the owner node to the delegated node. As described in the Arkko Application, the solution in the Arkko Application identifies whether the claimant is the owner node or the delegated node. This information can be used by an attacker to infer the location or other information about the owner host.

SUMMARY

The present invention provides a method for generating a network address that can be claimed and defended by multiple network devices. Such a network address is called a multi-key cryptographically generated address (MCGA). According to one embodiment of the invention, the network address can be generated by (a) obtaining a cryptographically generated identifier using public keys corresponding to the network devices, and (b) applying an address generation function to the cryptographically generated identifier. The address generation function may be a one-way coding function or a cryptographic hash of the public keys from all hosts that will advertise or claim the right to use the address.

In one embodiment, a message is sent by one of the network devices to claim the authority to use the network address. The message includes a digest of the message signed by the sending network devices using its private key. A multi-key signature, such as a ring signature, may also be used to cryptographically sign a message that claim the right to use the address or otherwise request operations. Alternatively, the message can be signed using a private key corresponding to the public keys used to generate the network address, and the message can indicate which public key may be used to validate the signature. Such a message may be a change in routing to be performed on the network address, for example. The MCGA may be used as source and destination addresses of a packet, or otherwise included in the message.

To verify the sending network device's claim of authority on the network address, the recipient of the message verifies the network address. In one embodiment, to verify the network address, the recipient extracts from the network address a copy of the cryptographically generated identifier included in the message. Based on its knowledge of how the cryptographically generated identifier is obtained, the recipient also generates a test cryptographically generated identifier from the public keys. The recipient compares the test cryptographically generated identifier with the extracted copy of the cryptographically generated identifier.

In one embodiment, the cryptographically generated identifier is created using public keys corresponding to the multiple network devices. The test cryptographically generated identifier is generated using all these public keys.

In one embodiment, the message further includes an encrypted digest of the message which is encrypted using the private key corresponding to one of the network devices. Authentication of the sender of the message may be achieved by obtaining a test digest from the message using the digest function, decrypting the encrypted digest, and comparing the decrypted digest to the test digest. The signature is generated with only the private key of the host sending the message, but requires the public keys of all the network devices claiming authority to verify. Unlike the prior art, when both an owner and a delegated host may claim and defend a network address, the present invention requires merely the public keys of the host and the delegated host prior to generating the address. No secure communication is required between the owner and the delegated host to notify the delegated host of the network address. The owner and the delegated host can independently sign messages claiming authorization of right to use the address using their respective private keys. Co-ordination as to which node has the responsibility at a particular time to defend the network address may be established using some other protocol, such as the Mobile IP protocol or DHCP. According to one embodiment of the present invention, when used with a multi-key signature algorithm that preserves anonymity, the network address would not identify which is the owner and which is the delegated host.

In one embodiment, a network node receiving a message claiming authorization for the address first checks the address by checking whether it was generated using a one-way coding function or a cryptographic hash of the public keys. The network node then checks the signature using the public keys. If both checks succeed, the receiving node knows that the sender is one of the nodes authorized to use the address, and therefore that it is safe to perform the requested operation.

Thus, the invention allows more than one network device to securely claim authorization of right to use an address. Verification of the multi-key cryptographically generated address and the signature on the message by a receiving network device establishes the authenticity of the claim of authorization.

The present invention is better understood upon consideration of the present invention and the accompanying drawings.

DETAILED DESCRIPTION OF THE PREFERRED EMBODIMENTS

Figure 1:
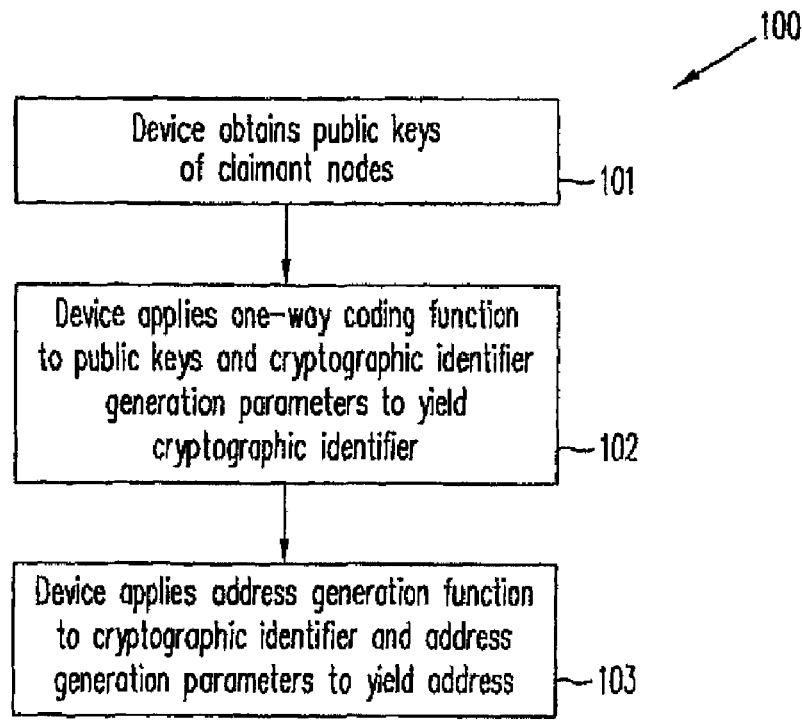
FIG. 1 is flow chart 100 illustrating device $d_i$ calculating a multi-key cryptographically generated address (MCGA) from public keys $pk_1$-$pk_n$ of devices $d_1, \ldots, d_n$, cryptographic identifier generation parameters, and address space parameters.
Figure 4:
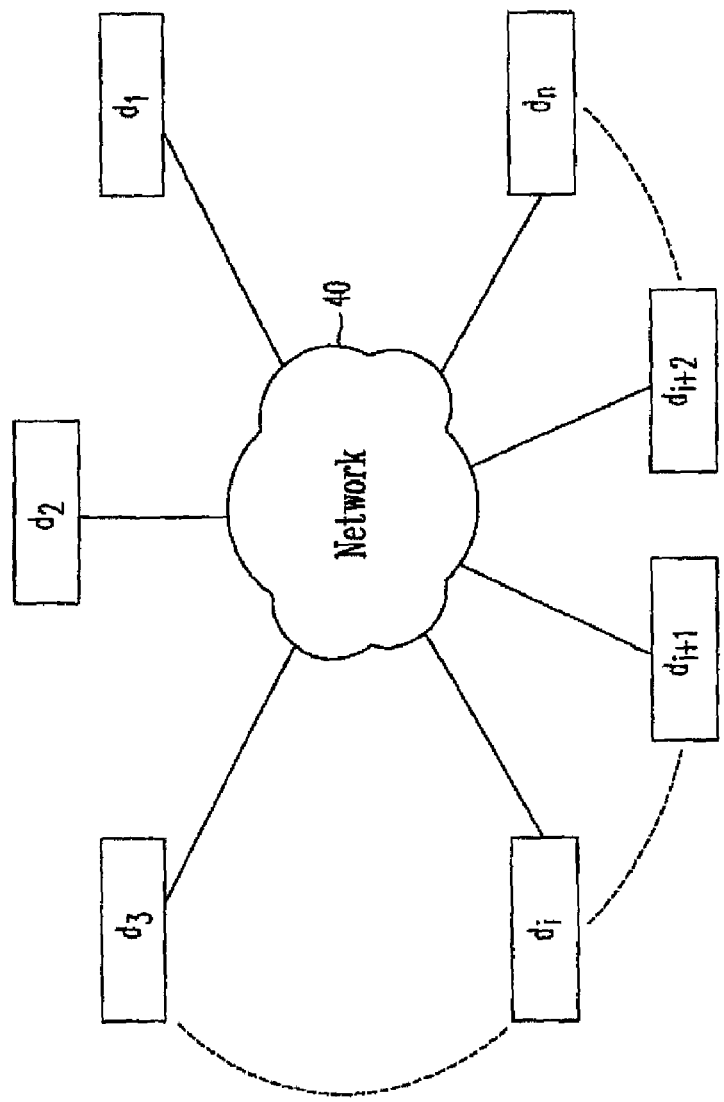
FIG. 4 shows network devices $d_1, \ldots, d_n$ communicating over network 40; some of network devices $d_1, \ldots, d_n$ may claim the right to use an address in network 40, in accordance with the present invention.

The prevent invention allows a network device to generate a network address for which the authorization for the right to use may be claimed by multiple devices. The invention is applicable to a computer network shown, for example, in FIG. 4, where network devices $d_1, \ldots, d_n$ communicates over network 40. Some of network devices $d_1, \ldots, d_n$ may claim the right to use an address in network 40, in accordance with the present invention. FIG. 1 is flow chart 100 illustrating device $d_i$ calculating a multi-key cryptographically generated address (MCGA) from public keys $pk_1$-$pk_n$ of devices $d_1, \ldots, d_n$, cryptographic identifier generation parameters, and address space parameters. Devices $d_1, \ldots, d_n$ claim authority to use the MCGA.

As shown in step 101 of flow chart 100, the network-connected device (say, $d_1$) obtains public keys $pk_2, \ldots, pk_n$, of the other devices $d_2, \ldots, d_n$, respectively, claiming authorization for the right to use the network address to be generated. At step 102, using its own and the obtained public keys, device $d_1$ creates a cryptographically generated identifier cid using a one-way coding function CODE-F (e.g., a cryptographic hash function):

$$cid = \text{CODE-}F(pk_1, \ldots, pk_n, x)$$

where x is one or more other parameters which provide additional entropy or uniqueness, or which indicate particular conditions involving the address or its generation.

At step 103, using the cryptographically generated identifier cid, device $d_1$'s network address net-addr is then generated using a suitable address generation function addr-f for the address space of the network (e.g., IPv6, IPv4, IEEE 802 MAC addresses):

$$\text{net-addr} = \text{addr-}f(cid, y)$$

where y is one or more other parameters specific to the network address space or generation technique needed to turn cid into a valid network address.

For example, in an IPv6 network, an appropriate network address IPv6-addr may be formed using the HMAC-SHA1 cryptographic hash function:

$$cid=\text{HMAC-SHA1}((pk_1|pk_2|\ldots|pk_n)|(s_1|s_2\ldots s_n))$$

$$\text{IPv6-addr}=\text{IPv6\_prefix}|\text{Btruc64}(cid)$$

where | is the bit-wise concatenation function, IPv6_prefix is a 64-bit subnet prefix, Btruc64 is a function that extracts the lower 64-bits of its argument, and $s_k$ is a private key-derived digital signature on a string of zero bits.

Figure 2:
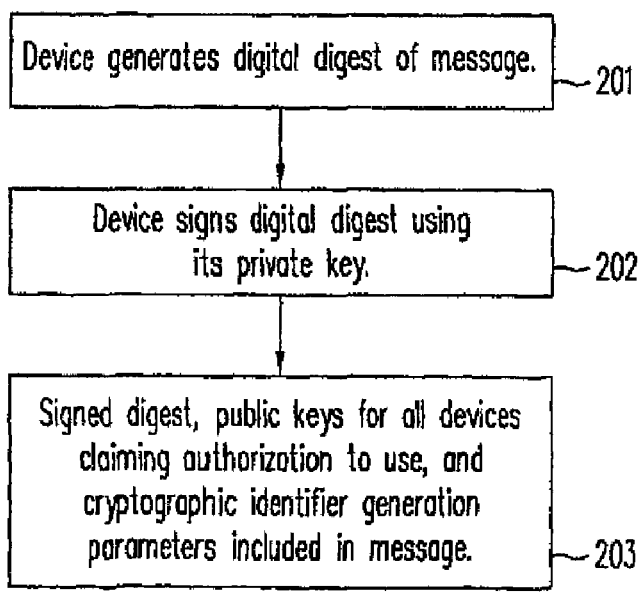
FIG. 2 is flow chart 200 illustrating device $d_i$ signing message m claiming authorization to use a MCGA.

FIG. 2 is flow chart 200 illustrating device $d_i$ signing message m claiming authorization to use a MCGA. After generation of the MCGA, device $d_i$ may send a network protocol message msg. The recipient of message msg may require device $d_i$ to prove its authorization to use the address. To demonstrate its authorization, device $d_i$ generates a digital signature sig on the message using a multi-key or single key digital signature calculation function SIGN (e.g., a ring signature function, or a single key signature function). First, at step 201, a digital digest of message msg is obtained:

$$\text{digest}=\text{DIGEST-}F(\text{msg})$$

At step 202, the generated digest is signed:

$$\text{sig}=\text{SIGN}(pvk_i, \text{digest})$$

where $pvk_i$ is the private key of a $pk_i/pvk_i$ key-pair (e.g., a standard RSA public key/private key pair).

At step 203, the signed digest, the public keys $pk_1, \ldots, pk_n$ of all claimants of the network address, and the cryptographic identifier generation parameters are included in message msg.

In one embodiment, a ring signature rs for message m may be used. Assume that DIGEST-F, described above, is a "collision-resistant" hash function that outputs a d-bit string. ("Collision-resistant" is a term used in the cryptographic literature meaning that it is computationally "hard" to find strings x and y such that x is not equal to y and DIGEST-F(x)=DIGEST-F(y).) Let E be an encryption scheme that uses d-bit keys and has b-bit input and output. (We impose an additional condition on b below.) Let t be a parameter—e.g., t may equal 80. Let · denote the XOR function.

The public keys in the ring signature are the same as public keys in RSA. Specifically $pk(i)=(N(i), e(i))$, where $N(i)$ is a large (e.g., 1024-bit) composite integer that is the product of two large prime numbers $p(i)$ and $q(i)$ and where $e(i)$ is an integer that is relatively prime to $(p(i)-1)(q(i)-1)$. Let b be an integer such that $2^b > 2^t N(i)$ for all i.

The ring signature is generated as follows. Let $pk(i)$ be the public key of the "real" signer. The signer:

1. Sets symmetric encryption key k to be DIGEST-F(m), where m is the message to be signed;
2. Picks a random b-bit string v;
3. For j from 1 to n (except j is not equal to i):
   a. Picks random b-bit string $x_j$;
   b. Computes $(q_j, r_j)$ such that $x_j = q_j N(j) + r_j$ for $r_j$ in the interval $[0, N(j)]$;
   c. Computes $y_j' = x_j^{e(j)} \pmod{N(j)}$ for $y_j'$ in the interval $[0, N(j)]$;
   d. Sets $y_j = q_j N(j) + y_j'$;
   e. Goes to Step 3a if $y_j$ is greater than or equal to $2^b$;
4. Computes $y_i$ such that $E_k(y_n \cdot E_k(y_{n-1} \cdot E_k(\ldots \cdot E_k(y_1 \cdot v)\ldots)))=v$;
5. Computes $(q_i, r_i)$ such that $y_i = q_i N(i) + r_i$ for $r_i$ in the interval $[0, N(i)]$;
6. Computes $x_i' = y_i^{1/e(i)} \pmod{N(i)}$ for $x_i'$ in the interval $[0, N(i)]$;
7. Sets $x_i = q_i N(i) + x_i'$;
8. Goes to Step 3 if $x_i$ is greater than or equal to $2^b$;
9. Outputs the ring signature $(x_1, \ldots, x_n, v)$.

Above, if t is large enough, there will be only a negligibly small probability that the signature generation algorithm will abort in Step 3e or Step 8 because $y_j$ or $x_i$ spills out of the permitted range of $[0, 2^b)$. Regarding Step 4 of signature generation above, notice that:

$$y_i = E_k^{-1}(y_n \cdot E_k^{-1}(\ldots y_{i+1} \cdot E_k^{-1}(v))) \cdot E_k(y_{i-1} \cdot E_k(\ldots \cdot E_k(y_1 \cdot v))).$$

In general, device $d_i$ inserts signature sig, the address generation parameters x (if required), the public keys $pk_1$-$pk_n$, and the address net-addr into a message msg claiming authorization for use of the address.

Figure 3:
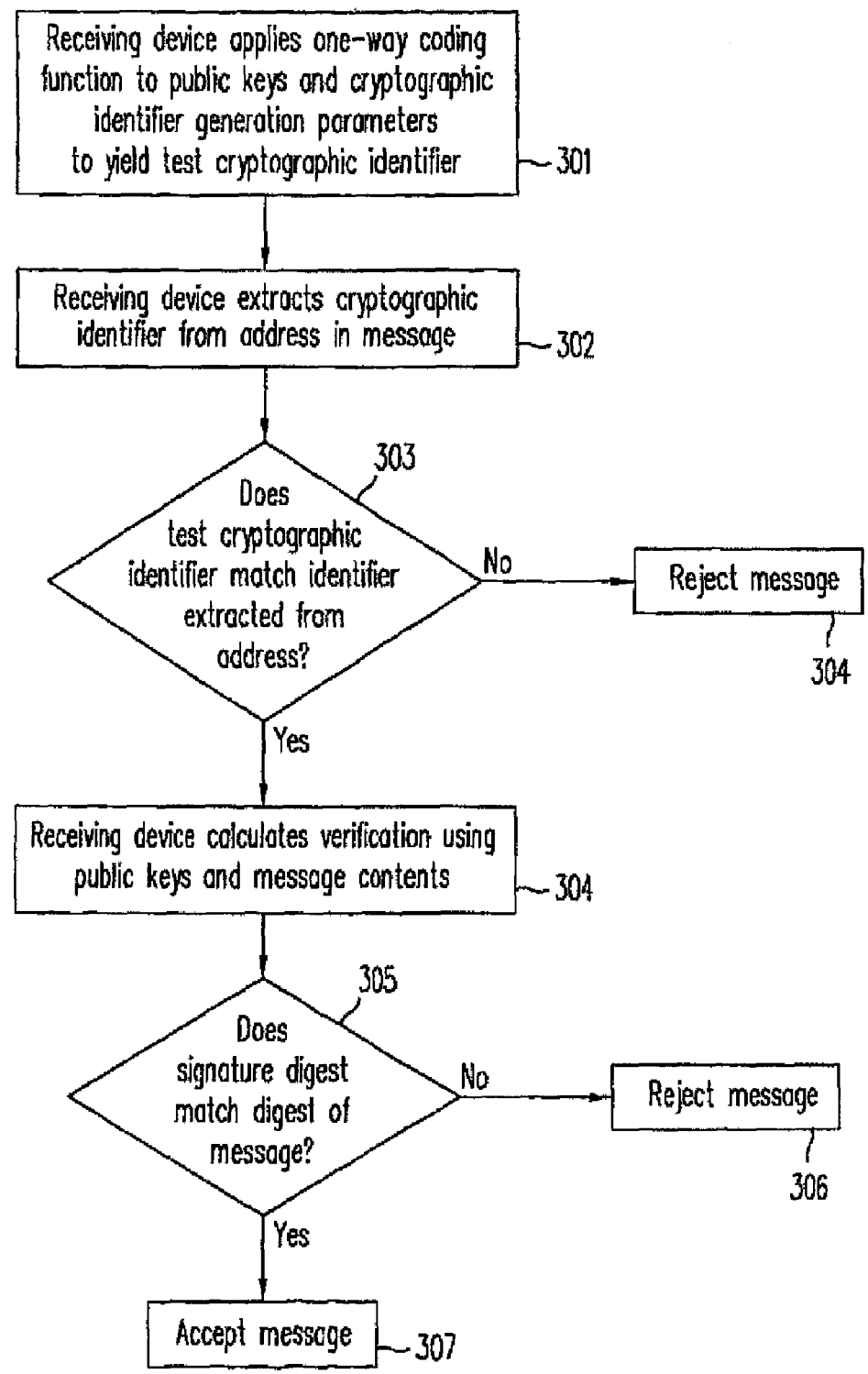
FIG. 3 is flow chart 300 illustrating, in a receiving device, verifying message m, which includes a claim of authorization to use a MCGA.

FIG. 3 is flow chart 300 illustrating, in a receiving device, verifying message m, which includes a claim of authorization to use a MCGA. At step 301, the receiving device of message msg checks authorization of right to use address net-addr by first repeating the address calculation to obtain a test cryptographically generated identifier. At the same time, the cryptographically generated identifier cid is taken from the address on message msg (step 302). Cryptographically generated identifier cid is then compared to the test cryptographically generated identifier to determine whether the claimed address can be generated using the public keys $pk_1$-$pk_n$ and the address generation parameters x (step 303). If the determination fails (i.e., the cryptographically generated identifiers do not match), message msg is rejected.

Then, at steps 305-308, the receiving device checks signature sig using public keys $pk_1$-$pk_n$ using a multi-key verification function VERIFY:

$$v=\text{VERIFY}(\text{sig}, pk_1, pk_2, \ldots, pk_n, \text{msg})$$

Function VERIFY extracts initially (step 304) a test digest of message msg using the public keys and the message content. The signed digest in message msg is decrypted by applying the public keys. The decrypted digest is then compared with the test digest (step 305). If the signature cannot be verified, function VERIFY returns v as 1 (step 306). Otherwise, VERIFY returns v as 0 (step 307).

In the ring signature example above, the verification of ring signature $rs(x_1, \ldots, x_n, v)$ in message m in the example discussed above may be calculated as follows:

1. Sets symmetric encryption key k to be DIGEST-F(m), where m is the message to be signed;
2. For j from 1 to n:
   a. Computes $(q_j, r_j)$ such that $x_j = q_j N(j) + r_j$ for for $r_j$ in the interval $[0, N(j)]$;
   b. Computes $y_j' = x_j^{e(j)} \pmod{N(j)}$ for $y_j'$ in the interval $[0, N(j)]$;
   c. Sets $y_j = q_j N(j) + y_j'$;
3. Confirms that $v = E_k(y_n \cdot E_k(y_{n-1} \cdot E_k(\ldots E_k(y_1 \cdot v)\ldots)))=v$.

In some embodiments, the methods of the present invention may be implemented as computer-executable instructions that may be stored or loaded into a computer-readable medium, such as a random access memory system or a magnetic disk recording medium.

The above detailed description is provided to illustrate specific embodiments of the present invention and is not intended to be limiting. Numerous modifications and variations within the scope of the present invention are possible. The present invention is set forth in the accompanying drawings.

I claim:

1. A method for generating a multi-key network address relating to a plurality of network devices, each network device in the plurality having its own public key and corresponding private key, comprising:
   in one of the multiple network devices: calculating a cryptographically generated identifier (cid) using the public keys corresponding to the plurality of network devices and a cryptographic hash function;
   applying an address generation function to the cid to create the multi-key network address;
   generating a message claiming the right to the multi-key address;
   obtaining a digital digest of the message;
   deriving a symmetric encryption key from the digital digest,
   for each public key, generating an integer x(i) using the encryption key and the public key;
   generating a ring signature of the digital digest using the integers x(i); and
   transmitting the message claiming the right to the multi-key address.

2. The method of claim 1, wherein the address generation function is selected from a one-way coding function and a cryptographic hash function using public keys.

3. The method of claim 1, wherein the signature is also a function of the private key for the one network device.

4. The method of claim 1, further comprising:
   receiving in an electronic device the message claiming the right to use the multi-key address;
   in the electronic device, calculating the cid using the public keys transmitted in the message and the HMAC-SHA-1 cryptographic hash function;
   extracting from the message a copy of the cryptographically generated identifier (cid); and
   comparing the calculated cid to the extracted cid.

* * * * *